United States Patent [19]

Watanabe

[11] Patent Number: 5,043,801
[45] Date of Patent: Aug. 27, 1991

[54] SOLID-STATE IMAGE SENSING APPARATUS WITH AN INDEPENDENTLY AND INDIVIDUALLY CONTROLLED PHOTOELECTRIC CONVERSION PERIOD FOR EACH PRIMARY COLOR FOR USE IN ACHIEVING A WHITE BALANCE

[75] Inventor: Tohru Watanabe, Ohgaki, Japan

[73] Assignee: Sanyo Electric Co., Ltd., Japan

[21] Appl. No.: 434,809

[22] Filed: Nov. 10, 1989

[30] Foreign Application Priority Data

Nov. 15, 1988 [JP] Japan .................. 63-289148

[51] Int. Cl.$^5$ .............................................. H04N 9/73
[52] U.S. Cl. ........................................ 358/29; 358/27
[58] Field of Search ............ 358/29 C, 27, 213.26, 358/43

[56] References Cited

U.S. PATENT DOCUMENTS 4,709,259 11/1987 Suzuki .................. 358/29 C
4,809,061 2/1989 Suzuki .................. 358/29 C

FOREIGN PATENT DOCUMENTS 52-52523 4/1977 Japan .................. 358/29 C
58-15381 1/1983 Japan .................. 358/29 C

*Primary Examiner*—James J. Groody
*Assistant Examiner*—Mark R. Powell
*Attorney, Agent, or Firm*—Peter L. Michaelson

[57] ABSTRACT

A solid-state image sensing apparatus comprises a light source (8) which emits a red monochromatic light (R), a green monochromatic light (G) and a blue monochromatic light (B) repeatedly one for every field to illuminate an object. A CCD solid-state image sensing device (1) converts the light reflected back from the object into charge signals. In the respective field periods, a charge signal converted by the CCD solid-state image sensing device (1) is expelled at a first timing and then read out at a second timing. The first timing is controlled for the respective field periods. This allows an effective photoelectric conversion period between the first and second timings to be controlled for the respective field periods.

20 Claims, 6 Drawing Sheets

SOLID-STATE IMAGE SENSING APPARATUS WITH AN INDEPENDENTLY AND INDIVIDUALLY CONTROLLED PHOTOELECTRIC CONVERSION PERIOD FOR EACH PRIMARY COLOR FOR USE IN ACHIEVING A WHITE BALANCE

BACKGROUND OF THE INVENTION

1. Field of the Invention

The present invention generally relates to solid-state image sensing apparatuses, and more particularly, to a solid-state image sensing apparatus provided with an adjusting function for white balance, and a white balance adjusting method.

2. Description of the Art

In general, color image sensing with the use of a solid-state image sensing device such as CCD (Charge Coupled Device) has been implemented by provision of a color separating filter on an image sensing portion of a CCD. Meanwhile, a CCD camera for specific application has implemented color image sensing by using a light source of periodic emitting-type. The periodic emitting-type light source emits monochromatic lights such as red (R), green (G) and blue (B) repeatedly one for every field. An object is illuminated by this periodic emitting-type light source and sensed for its image by the CCD having no color filter mounted thereon, from which picture signals are obtained to be combined for every field. In such a manner, color image sensing has been implemented.

FIG. 1 is a block diagram showing a structure of a solid-state image sensing apparatus using a periodic emitting-type light source as described above.

A timing control circuit 7 generates, based on a basic clock CK, a horizontal scanning signal (or horizontal synchronizing signal) HD, a vertical scanning signal (or vertical synchronizing signal) VD, a sampling pulse SP synchronized with the vertical scanning signal VD, and a read timing signal FT. The read timing signal FT gets a read transfer pulse at a specific timing during the respective blanking periods of the vertical scanning signal VD. A light source 8 for illuminating an object is synchronized with the vertical scanning signal VD to emit the monochromatic lights R, G and B repeatedly each for one V period (one period of the vertical scanning signal). The light source 8 is constituted as being provided with a rotating filter plate in the optical path of white light illuminating an object, which comprises color filters of red, green and blue, and is synchronized with the vertical scanning signal VD for rotation.

A CCD solid-state image sensing device of the frame transfer type (referred to as CCD hereinafter) 1 comprises a photosensitive portion I, a storage portion S and a horizontal register H. This CCD 1 is driven by a drive circuit 6. The drive circuit 6 comprises a read transfer pulse generating circuit 6F for generating a read transfer pulse $\phi_F$, a storage transfer pulse generating circuit 6S for generating a storage transfer pulse $\phi_S$ and an output transfer pulse generating circuit 6H for generating an output transfer pulse $\phi_H$.

These pulse generating circuits 6F, 6S and 6H operate based on the basic clock CK from the same oscillation source for generating the transfer pulses $\phi_F$, $\phi_S$ and $\phi_H$, respectively.

The photosensitive portion I photoelectrically converts the light reflected back from the object for every one picture frame. Picture information (charge signals) obtained from the photosensitive portion I are read out in response to the read transfer pulse $\phi_F$, to be first transferred to the storage portion S. The picture information stored in the storage portion S is transferred to the horizontal register H in response to the storage transfer pulse $\phi_S$ with one scanning line for a single horizontal blanking period. The picture information having been transferred to the horizontal register H is outputted as a picture signal Y in response to the output transfer pulse $\phi_H$.

The picture signal Y is controlled in gain at an AGC circuit 2 before entered in sample and hold circuits 3R, 3G and 3B. The sample and hold circuits 3R, 3G and 3B sample and hold the picture signal Y for every vertical blanking period, based on the sampling pulse SP. This permits the picture signal Y to be separated in color component signals R, G and B, and then entered in gain control amplifiers 4R, 4G and 4B, respectively. The gain control amplifiers 4R, 4G and 4B are responsive to gain control signals CR, CG and CB for controlling the color component signals R, G and B in level to apply them to a signal processing circuit 5. The signal processing circuit 5 performs gamma correction, pedestal control and the like to output the color component signals R, G and B.

Light emission LC of such a light source 8 as described above is, as shown in FIG. 2, synchronized with the vertical scanning signal VD to take colors of red R, green G and blue B repeatedly one for every one V period. The photosensitive portion I is driven by the read transfer pulse $\phi_F$ so that a charge signal can be read out during a blanking period of the vertical scanning signal VD. Respective periods between one reading of a charge signal and the subsequent reading of another charge signal are regarded as photoelectric conversion periods $E_R$, $E_G$ and $E_B$. These photoelectric conversion periods $E_R$, $E_G$ and $E_B$ correspond to the respective monochromatic lights R, G and B of the light source 8. Picture information having been obtained during the respective photoelectric conversion periods is read out in the subsequent fields, producing a picture signal Y. Therefore, in the picture signal Y, color components R, G and B appear by turns repeatedly, with one field (1V period) as a unit of the turn, to be outputted with a delay of one field with respect to the light emission LC.

The picture signal with the color components R, G and B appearing field by field is, as described above, sampled and held by the sample and hold circuits 3R, 3G and 3B sequentially for every one field to be separated in color component signals R, G and B.

When white balance of the picture signal is to be adjusted in the above solid-state image sensing apparatus, the color component signals R, G and B are individually changed in level by changing the gain control signals CR, CG and CB to be entered in the gain control amplifiers 4R, 4G and 4B, based on the light source.

However, when there are excessive differences between the levels of color component signals R, G and B, the gains of the gain control amplifiers 4R, 4G and 4B for the respective color components must be changed considerably in order to adjust white balance. This may disturb the balance of S/N ratio of the color component signals R, G and B, possibly resulting in degraded picture quality of a reproduced picture plane.

SUMMARY OF THE INVENTION

An object of the present invention is to adjust white balance in a solid-state image sensing apparatus using a periodic emitting-type light source which emits a plurality of monochromatic lights field by field, without disturbing the balance of S/N ratio of the respective color component signals.

A solid-state image sensing apparatus according to the present invention comprises a light emitting device for emitting a plurality of monochromatic lights repeatedly at predetermined periods to illuminate an object, a photoelectric conversion element for converting the light reflected back from the object into charge signals, and a control device for making the charge signals converted by the photoelectric conversion element disappear at a first timing and then reading out the same at a second timing. The control device sets the first and second timings at predetermined periods to control an effective photoelectric conversion period between the first and second timings at the predetermined periods.

In the solid-state image sensing apparatus, by individually controlling the effective photoelectric conversion periods at the respective predetermined periods corresponding to the plurality of monochromatic lights from the light emitting device, balance of the color components corresponding to those monochromatic lights is adjusted in the photoelectric conversion element. This permits picture signals balanced in their color components to be outputted from the photoelectric conversion element. Accordingly, it is no longer necessary to adjust the respective picture signals in level for every color component so that dispersion in S/N ratio of the color component signals can be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described in detail with reference to the accompanying drawings.

Figure 3:
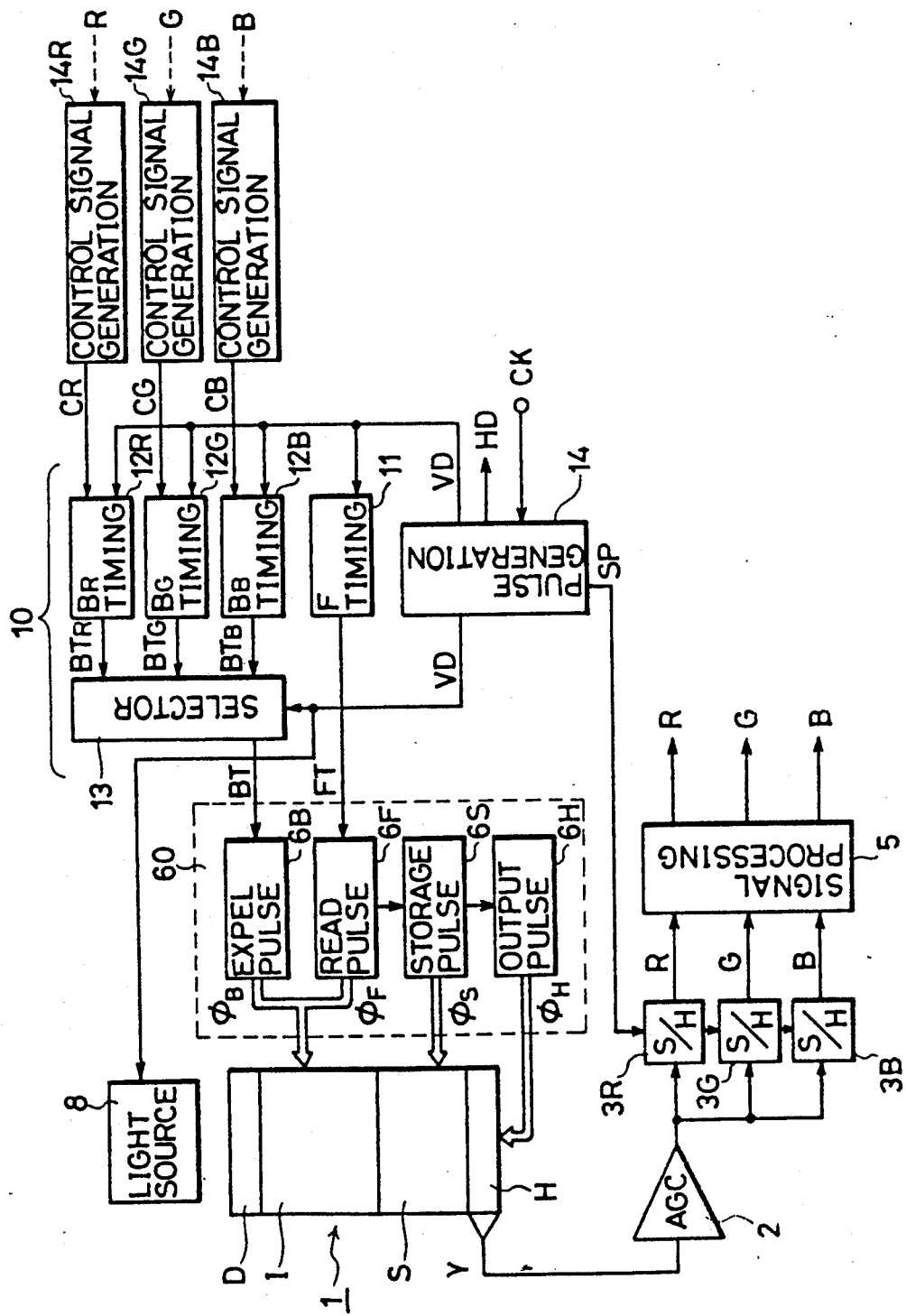
FIG. 3 is a block diagram showing a structure of a solid-state image sensing structure according to an embodiment of the present invention.

FIG. 3 is a block diagram showing a structure of a solid-state image sensing apparatus according to an embodiment of the present invention.

In FIG. 3, a CCD solid-state image sensing device (referred to simply as CCD hereinafter) 1, an AGC circuit 2, sample and hold circuits 3R, 3G and 3B, and a signal processing circuit 5 are constituted in the same manner as those in the solid-state image sensing apparatus of FIG. 1. Meanwhile, the CCD 1 has an expel drain D for expelling charges. A picture signal Y obtained by the CCD 1 is first controlled for its gain in the AGC circuit 2 being before sampled and held by the sample and hold circuits 3R, 3G and 3B based on a sampling pulse SP so as to be separated in color component signals R, G and B. Processing including gamma correction, pedestal control and the like is performed on these color component signals R, G and B in the signal processing circuit 5.

A timing control circuit 10 comprises a read timing generating circuit 11, expel timing generating circuits 12R, 12G and 12B, a selector 13 and a pulse generating circuit 14. The pulse generating circuit 14 generates, based on a basic clock CK, a horizontal scanning signal (or horizontal synchronizing signal) HD, a vertical scanning signal (or vertical synchronizing signal) VD, and the sampling pulse SP synchronized with the vertical scanning signal VD.

The read timing generating circuit 11 is responsive to the vertical scanning signal VD for generating a read timing signal FT. The expel timing generating circuit 12R is responsive to a control signal CR applied from a control signal generating circuit 14R and the vertical scanning signal VD for generating an expel timing signal $BT_R$. The expel timing generating circuit 12G is responsive to a control signal CG applied from a control signal generating circuit 14G and the vertical scanning signal VD for generating a expel timing signal $BT_G$. The expel timing generating circuit 12B is responsive to a control signal CB applied from a control signal generating circuit 14B and the vertical scanning signal VD for generating a expel timing signal $BT_B$.

The selector 13 is synchronized with the vertical scanning signal VD to select one of the expel timing signals $BT_R$, $BT_G$ and $BT_B$ sequentially for outputting it as an expel timing signal $B^T$.

Figure 1:
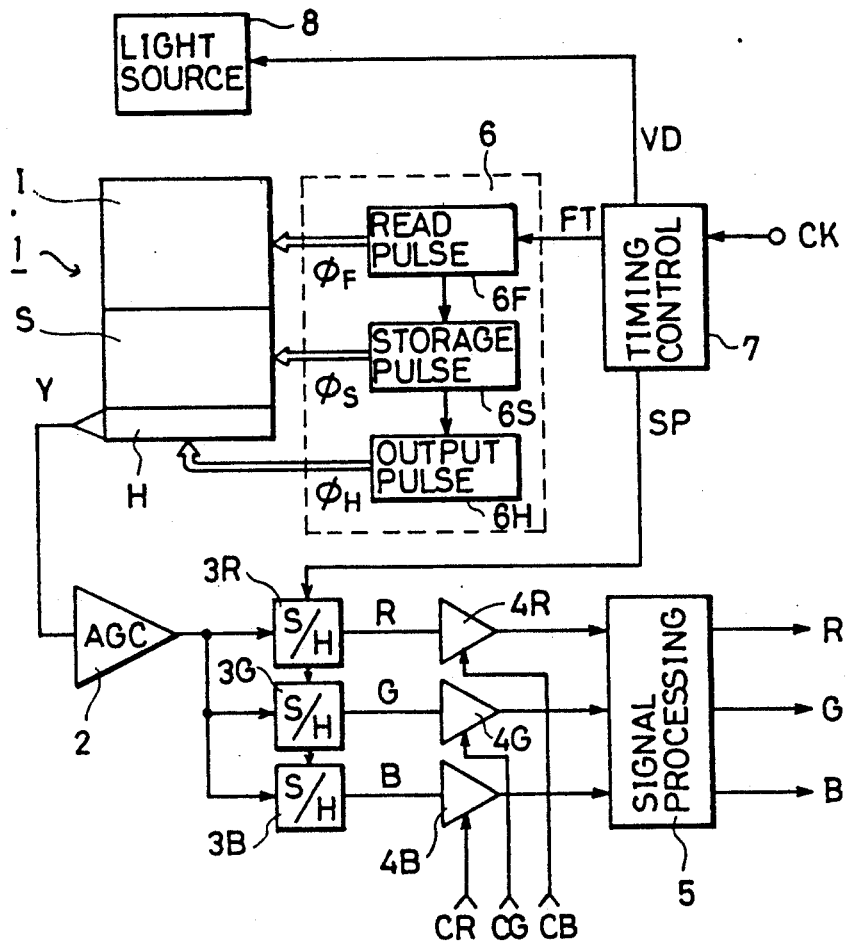
FIG. 1 is a block diagram showing a structure of a conventional solid-state image sensing apparatus.

A drive circuit 60 comprises, like the drive circuit 6 in FIG. 1, a read transfer pulse generating circuit 6F, a storage transfer pulse generating circuit 6S, an output transfer pulse generating circuit 6H, and additionally an expel transfer pulse generating circuit 6B. The read transfer pulse generating circuit 6F is responsive to the read timing signal FT from the read timing generating circuit 11 for applying a read transfer pulse $\phi_F$ to a photosensitive portion I. The expel transfer pulse generating circuit 6B is responsive to the expel timing signal BT from the selector 13 for applying an expel transfer pulse $\phi_B$ to the photosensitive portion I. The expel transfer pulse $\phi_B$ and the read transfer pulse $\phi_F$ have phases different from each other. A charge signal obtained in the photosensitive portion I is transferred to a drain D, in response to the expel transfer pulse $\phi_B$, where that charge signal disappears. The storage transfer pulse generating circuit 6S applies a storage transfer pulse $\phi_S$ to a storage portion S. The output transfer pulse generating circuit 6H applies an output transfer pulse $\phi_H$ to a horizontal register H.

Meanwhile, a light source 8 for illuminating an object is synchronized with the vertical scanning signal VD to repeatedly emit one of the monochromatic lights R, G and B for every field. Therefore, the object will be illuminated by any one of the monochromatic lights R, G and B repeatedly.

In a field where the monochromatic light R is emitted toward the object, the expel timing signal $BT_R$ is selected to be applied to the expel transfer pulse generating circuit 6B. Furthermore, in another field where the monochromatic light G is emitted toward the object, the expel timing signal $BT_G$ is selected to be applied to the expel transfer pulse generating circuit 6B. In still another field where the monochromatic light B is emitted toward the object, the expel timing signal $BT_B$ is selected to be applied to the expel transfer pulse generating circuit 6B. These expel timing signals $BT_R$, $BT_G$ and $BT_B$ are each generated at a timing according to the control signals CR, CG and CB, respectively.

Figure 2:
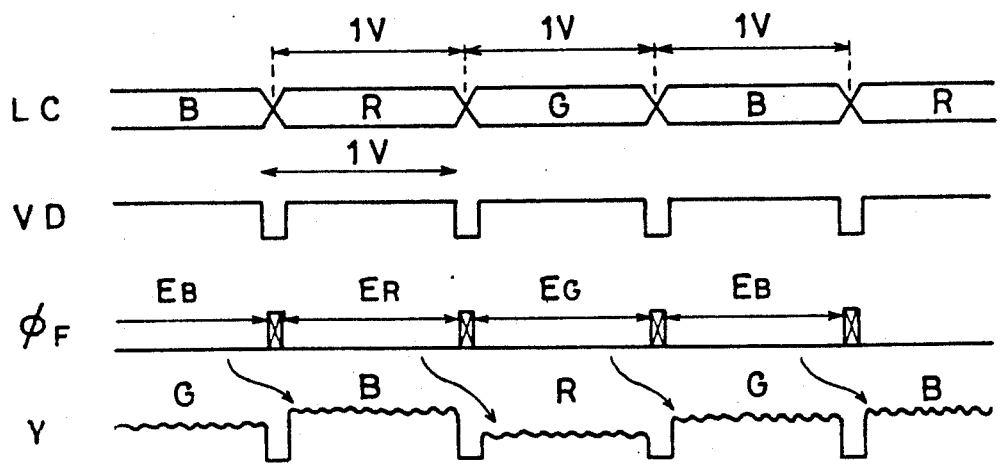
FIG. 2 is a timing chart for explaining operation of the solid-state image sensing apparatus in FIG. 1.
Figure 4:
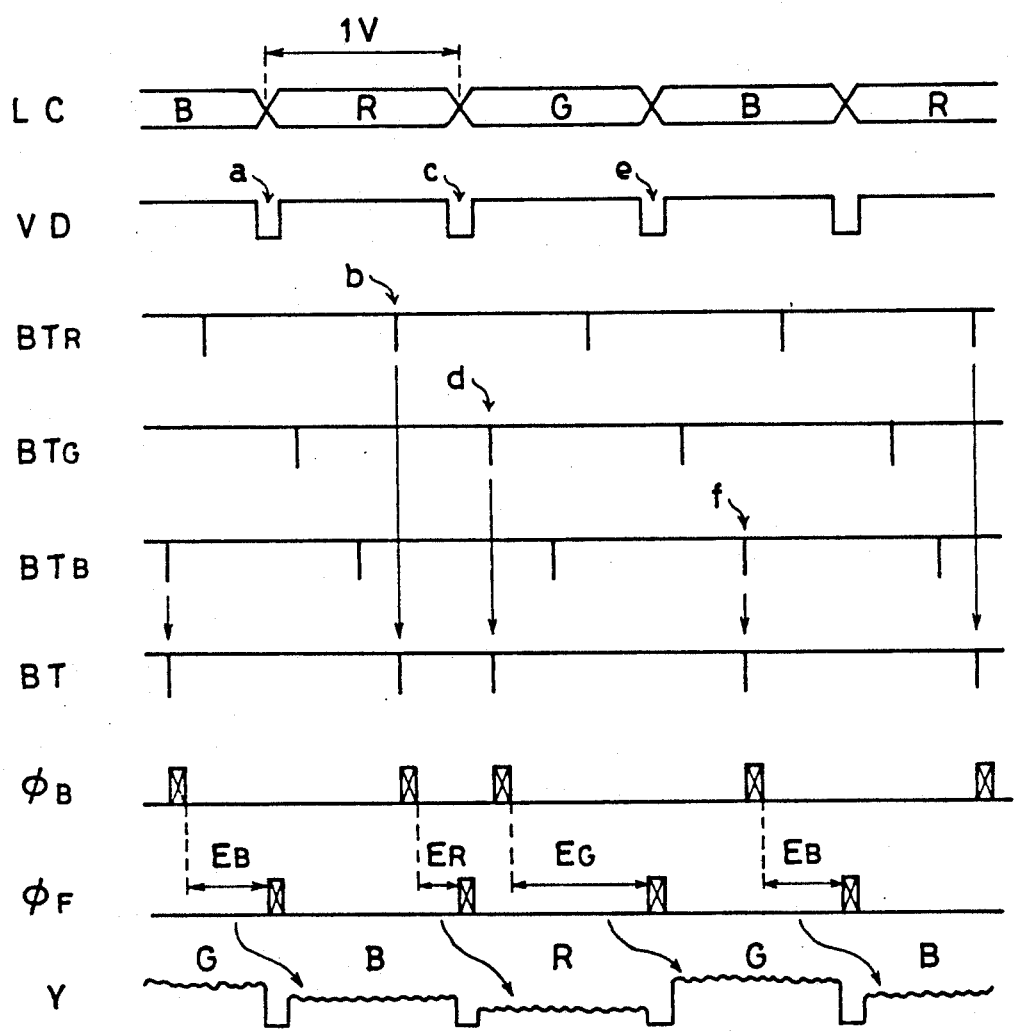
FIG. 4 is a timing chart for explaining operation of the solid-state image sensing apparatus in FIG. 3.

FIG. 4 is a timing chart for explaining the operation of the solid-state image sensing apparatus in FIG. 3. Light emission LC from the light source 8 is, as in FIG. 2, synchronized with the vertical scanning signal VD to become red R, green G and blue B repeatedly one for every one V period. The colors will change during a blanking period of the vertical scanning signal VD. The expel timing signals $BT_R$, $BT_G$ and $BT_B$ get pulses each at timings according to the control signals CR, CG and CB, respectively, to be entered in the selector 13.

The selector 13 is synchronized with the vertical scanning signal VD to be switched. For example, when switched to the side of the expel timing generating circuit 12R during a blanking period a of the vertical scanning signal VD, the selector 13 selects a pulse b, and when switched to the side of the expel timing generating circuit 12G in the subsequent blanking period c, it selects a pulse d. Subsequently, when switched to the side of the expel timing generating circuit 12B during a blanking period e, the selector 13 selects a pulse f. The selector 13 supplies these selected pulses to the expel transfer pulse generating circuit 6B as expel timing signals BT.

The expel transfer pulse generating circuit 6B is responsive to the expel timing signal BT for outputting the expel transfer pulse $\phi_B$. Effective photoelectric conversion periods $E_R$, $E_G$ and $E_B$ are set by the expel transfer pulses $\phi_B$ and the read transfer pulses $\phi_F$. The picture information obtained in these effective photoelectric conversion periods $E_R$, $E_G$ and $E_B$ is read out in the subsequent fields to constitute the picture signal Y.

In the present solid-state image sensing apparatus, the timings for expelling the charge signals obtained by photoelectric conversion are individually set for the respective fields corresponding to the monochromatic lights R, G and B from the light source 8 so that the effective photoelectric conversion periods of the solid-state image sensing device can be controlled for the respective fields. This enables white balance adjusting for the picture signals.

More specifically, when one of the color component signals R, G and B has a higher level than the other two ones, the expel timing in the field corresponding to the high-level color component signal is delayed to set its effective photoelectric conversion period shorter. Conversely, when one of the color component signals R, G and B has a lower level than the other two ones, the expel timings in the fields corresponding to the other two ones are delayed to set their effective photoelectric conversion periods shorter. This is the way the white balance adjusting is performed.

Figure 5:
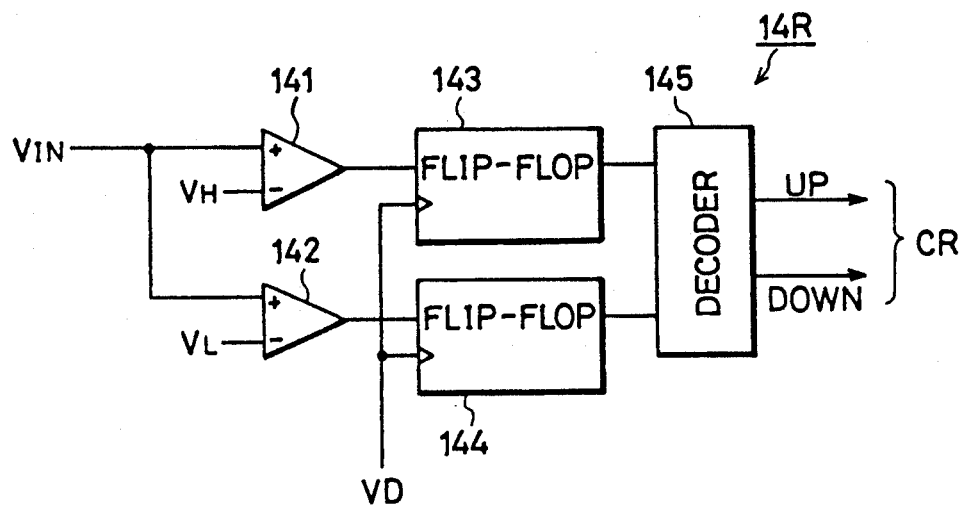
FIG. 5 is a block diagram showing a structure of a control signal generating circuit contained in the solid-state image sensing apparatus of FIG. 3.

In FIG. 5, an illustrative structure of the control signal generating circuit 14R is shown, while the control signal generating circuits 14G and 14B are constituted in the same manner as that in FIG. 5.

The control signal generating circuit 14R comprises comparators 141 and 142, flip-flops 143 and 144, and a decoder 145. The comparators 141 and 142 compare dc voltage $V_{IN}$ with reference voltages $V_H$ and $V_L$ ($V_H > V_L$), respectively. The flip-flops 143 and 144 are synchronized with the vertical scanning signal VD to apply outputs from the comparators 141 and 142 to the decoder 145. The decoder 145 outputs an up-count signal UP where $V_{IN} > V_H$, a down-count signal DOWN where $V_L > V_{IN}$, and nothing where $V_H > V_{IN} > V_L$. The up-count signal UP and the down-count signal DOWN constitute the control signal CR.

Meanwhile, the dc voltage $V_{IN}$ will be provided by a variable resistor and the like in case of manual operation. Furthermore, as indicated by a broken line in FIG. 3, automatic control is possible when level of the color component signal R is applied as the dc voltage $V_{IN}$.

Figure 6:
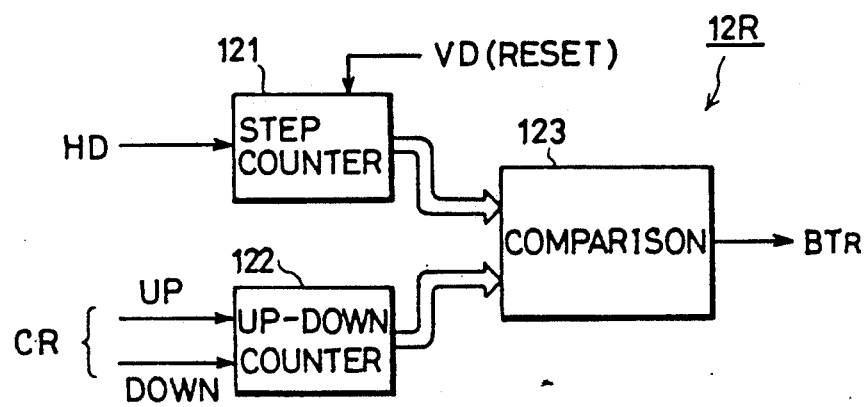
FIG. 6 is a block diagram showing a structure of a expel timing generating circuit contained in the solid-state image sensing apparatus of FIG. 3.

In FIG. 6, an example structure of the expel timing generating circuit 12R is shown. The expel timing generating circuits 12G and 12B are also constituted in the same manner as that in FIG. 6.

The expel timing generating circuit 12R comprises a step counter 121, an up-down counter 122 and a comparator 123. The step counter 121 is responsive to the horizontal scanning signal HD for performing an up-count operation. The up-down counter 122 is responsive to the up-count signal UP for performing an up-count operation and responsive to the down-count signal DOWN for performing a down-count operation. The comparator 123 compares output of the step counter 121 with that of the up-down counter 122 to output the expel timing signal $BT_R$ only when coincidence is found therebetween.

Contents of the up-down counter 122 correspond to the numbers of horizontal scanning lines. In other words, the up-down counter 122 stores an expel timing by the number of a horizontal scanning line. The expel timing is delayed when the up-down counter 122 counts up, and accelerated when the same counts down.

Structure of the expel timing generating circuit is not limited to that shown in FIG. 6. In place of the up-down counter 122, for example, another means applying data of the same bit number may be provided. For example, a memory can be employed.

Furthermore, it is also possible to do without any counter in delaying the rise timing of the vertical scanning signal VD in an analog manner with the use of an RC circuit and the like so as to generate a one shot pulse in response to the delayed rise.

Figure 7:
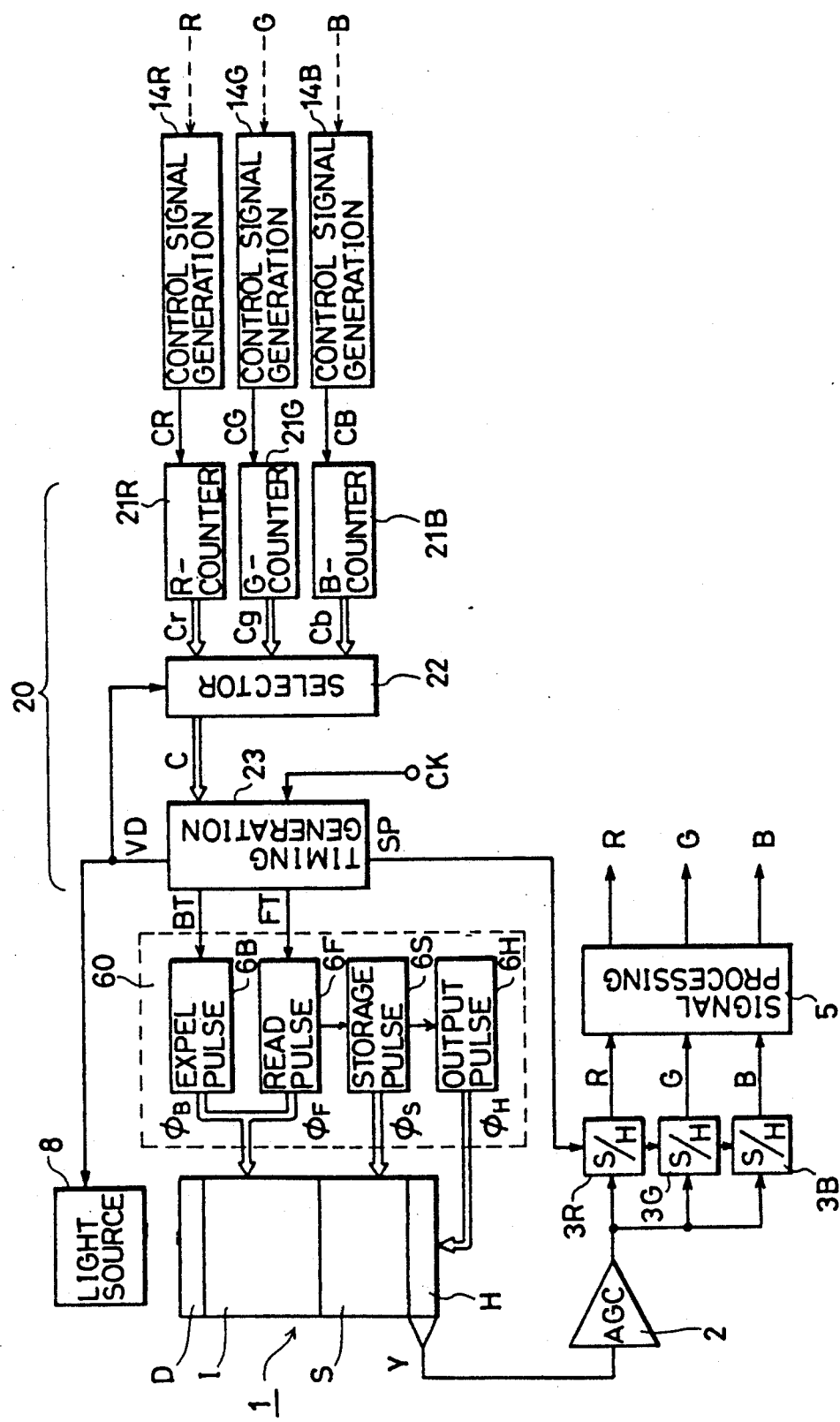
FIG. 7 is a block diagram showing a structure of the solid-state image sensing apparatus according to another embodiment of the present invention.

FIG. 7 is a block diagram showing a structure of a solid-state image sensing apparatus according to another embodiment of the present invention.

In this embodiment, a timing control circuit 20 comprises counters 21R, 21G and 21B, a selector 22 and a timing generating circuit 23. The other portions are constituted in the same manner as that shown in FIG. 3, and like portions bear like numerals or characters.

The counters 21R, 21G and 21B are responsive to control signals CR, CG and CB, respectively, for performing count-up or count-down to output count signals Cr, Cg and Cb. These counters 21R, 21G and 21B store expel timings of the charge signals obtained by photoelectric conversion, like the up-down counter 122 shown in FIG. 6, with the numbers of horizontal scanning lines for the respective fields corresponding to the monochromatic lights R, G and B from the light source 8. The selector 22 is synchronized with a vertical scanning signal VD to repeatedly select one of the count signals Cr, Cg and Cb for every field to apply it as a count signal C to the timing generating circuit 23.

Figure 8:
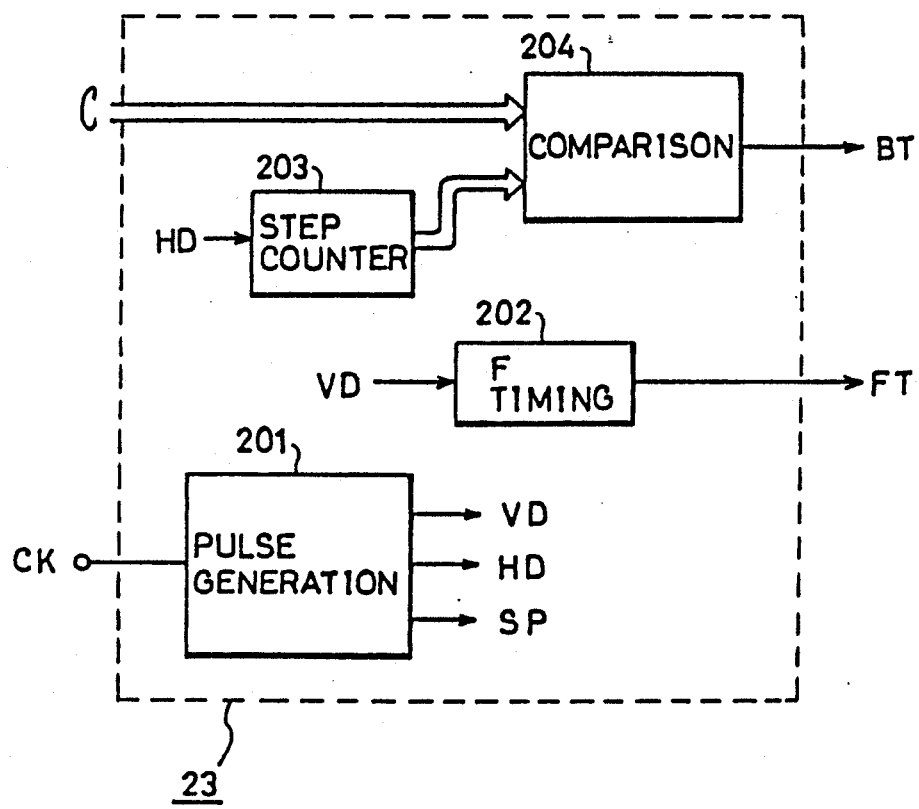
FIG. 8 is a block diagram showing a structure of a timing generating circuit contained in the solid-state image sensing apparatus of FIG. 7.

In FIG. 8, a structure of the timing generating circuit 23 is shown. The timing generating circuit 23 comprises a pulse generating circuit 201, a read timing generating circuit 202, a step counter 203 and a comparator 204. The pulse generating circuit 201 generates, based on a basic clock CK, a horizontal scanning signal HD, the vertical scanning signal VD and a sampling pulse SP. The read timing generating circuit 202 generates a read timing signal FT synchronized with the vertical scanning signal VD. The step counter 203 counts the horizontal scanning signal HD to apply its count value to the comparator 204. The comparator 204 compares the count signal C applied from the selector 22 with the count value applied from the step counter 203 to generate an expel timing signal BT which gets a pulse at the timing of coincidence therebetween.

In the present embodiment, the counters 21R, 21G and 21B perform count-up or count-down according to the control signals CR, CG and CB so that individual control of the effective photoelectric conversion periods $E_R$, $E_G$ and $E_B$ in the fields corresponding to the color component signals R, G and B, respectively, becomes possible. More specifically, where one of the color component signals R, G and B has a higher level than the other two ones, a counter corresponding to the high-level color component signals performs count-up. This causes the expel timing in the field corresponding thereto to be delayed so that the effective photoelectric conversion period is set shorter, limiting the level of the color component signal.

In the embodiment shown in FIG. 7, the number of the counters are reduced as compared with the embodiment in FIG. 3.

While in the embodiments above, red, green and blue have been employed as the three monochromatic lights, any complementary color of those may be used. For example, yellow, cyan and magenta, or yellow, cyan and green may be used as the three monochromatic lights.

As has been described in the foregoing, according to the present invention, the individual control of the effective photoelectric conversion periods for the respective fields corresponding to the monochromatic lights enables control of spectral sensitivity of the solid-state image sensing device. This allows the picture signals obtained from the solid-state image sensing device to be adjusted in white balance. Therefore, after the picture signals are separated in color component signals, it is no longer necessary for those color component signals to be controlled in level, which allows expansion of dynamic range as well as reduction of dispersion in the S/N ratio of the color component signals. Accordingly, the picture quality of the reproduced picture plane will be enhanced.

In addition, it becomes possible to construct the circuit for white balance adjustment using a digital circuit, which is effective in achieving a higher integration and improving reliability of the circuitry.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solid-state image sensing apparatus for producing a substantially white balanced depiction of an object, comprising:

light emit means (8) for repeatedly emitting each one of a plurality of monochromatic lights in succession at predetermined periods to illuminate an object, each of said lights being emitted during a corresponding one of said pre-determined periods, photoelectric conversion means (1) for converting light produced by said light emit means and reflected back from said object into a charge signal, control means (10, 60; 20), operative in conjunction with said photoelectric conversion means, for transferring charge at a first timing and in a first direction within said photoelectric conversion means so as to expel residual charge existing therein and, in so doing, set the charge signal to an initial value and for transferring charge within said photoelectric conversion means, at a second timing and in a direction opposite to said first direction, that has accumulated between said first and second timings and in response to said reflected light, so as to read a value of said charge signal attributable to said accumulated charge occurring for one of said predetermined periods, said second timing occurring subsequent to said first timing, and color signal forming means (2, 3R, 3G, 3B, 5) for converting said charge signal into color signals, and said control means comprising means (12R, 12G, 12B, 14, 14R, 14G, 14B; 21R, 21G, 21B, 22, 23) for setting said first and second timings for each individual one of said predetermined periods so as to control duration of an effective photoelectric conversion period occurring between said first and second timings for said each individual one period such that the duration of said photoelectric conversion period is individually set for each of said monochromatic lights so as to appropriately vary an amplitude of an output signal from said photoelectric conversion means for each of said monochromatic lights in order to substantially achieve a white balance in said color signals.

2. The solid-state image sensing apparatus according to claim 1, wherein said plurality of monochromatic lights comprise first, second and third monochromatic lights, and said light emit means (8) emits said first, second and third monochromatic lights repeatedly one for each one of said respective predetermined periods.

3. The solid-state image sensing apparatus according to claim 2, wherein said control means (10, 60; 20) comprises:

first setting means (12R, 14R) for setting said effective photoelectric conversion period in the predetermined period corresponding to said first monochromatic light;

third setting means (12B, 14B) for setting said effective photoelectric conversion period in the predetermined period corresponding to said third monochromatic light.

4. The solid-state image sensing apparatus according to claim 1, wherein said control means comprises:

a plurality of first signal generating means (12R and 14R; 12G and 14G; 12B and 14B), corresponding to said plurality of monochromatic lights, for each generating a first timing signal to determine said first timing in the respective predetermined periods;

selecting means (13; 22) for sequentially selecting one of said plurality of first timing signals corresponding to the one of said plurality of monochromatic lights being emitted, and for applying the one timing signal so selected to said photoelectric conversion means (1); and second signal generating means (11; 202) for generating a second timing signal to determine said second timing in the respective predetermined periods and applying the second timing signal to said photoelectric conversion means (1).

5. The solid-state image sensing apparatus according to claim 4, wherein
each of said plurality of first signal generating means comprises:
control signal generating means (14R, 14G and 14B) for generating a control signal; and
timing signal generating means (12R, 12G and 12B; 21R, 21G and 21B) responsive to said control signal for generating said first timing signal at a timing designated by the control signal.

6. The solid-state image sensing apparatus according to claim 5, wherein
said predetermined period is a field period,
said control means further comprises synchronizing signal generating means (14; 201) for generating a first synchronizing signal which has a period corresponding to one field,
said light emit means (8) is synchronized with said first synchronizing signal to sequentially emit each one of said plurality of monochromatic lights, and
said selecting means (13, 22) is synchronized with said first synchronizing signal to sequentially select one of said plurality of first timing signals.

7. The solid-state image sensing apparatus according to claim 4, wherein
said plurality of monochromatic lights comprise any three lights of red, green, blue and their complementary colors.

8. The solid-state image sensing apparatus according to claim 5, wherein said color signal forming means comprises:
color component generating means (3R, 3G and 3B), responsive to the output signal of said photoelectric conversion means (1), for sequentially generating a plurality of color component signals corresponding to said plurality of monochromatic lights, and
wherein said control signal generating means (14R, 14G and 14B) is responsive to a level of the corresponding color component signal for generating said control signal.

9. The solid-state image sensing apparatus according to claim 5, wherein said color signal forming means comprises:
color component generating means (3R, 3G and 3B), responsive to the output signal of said photoelectric conversion means (1), for sequentially generating a plurality of color component signals corresponding to said plurality of monochromatic lights, and
wherein said control signal generating means (14R, 14G and 14B) generates said control signal through manual operation.

10. The solid-state image sensing apparatus according to claim 1 wherein each of said second timings occurs at fixed intervals therebetween and said first timings occur at varying intervals prior to corresponding ones of said first timings.

11. The solid-state image sensing apparatus according to claim 5 wherein each of said control signal generating means (14R, 14G, 14B) comprises:
input signal comparison means (141, 142) for comparing an input signal against pre-defined high and low reference levels, and
means (143, 144, 145), responsive to a first synchronization signal having a period corresponding to one field and to said input signal comparison means, for generating, in synchronism with said first synchronization signal, first or second direction signals as said control signal in the event said input signal is greater than said high reference level or is less than said low reference level, respectively.

12. The solid-state image sensing apparatus according to claim 11 wherein each of said timing signal generating means (12R, 12G, 12B) comprises:
first counting means (121), responsive to a second synchronizing signal having a period corresponding to each line in said field, for counting lines in each field and for providing a first counted value for each of said lines,
value producing means (122), responsive to said first and second direction signals, for providing a second value which identifies a particular line at which said effective photoelectric conversion period is to start within a corresponding predetermined field, and
comparison means (123), responsive to said first counting means and to said value producing means, for providing a pulse as said first timing when the first counted value and the second value coincide.

13. The solid-state image sensing apparatus according to claim 12 wherein said value producing means comprises either a memory, responsive to said first and second direction signals, for producing said second value or second counting means for respectively incrementing and decrementing its contents in response to said first and second direction signals and for providing the contents as said second value.

14. The solid-state image sensing apparatus according to claim 12 wherein said color signal forming means comprises:
color component generating means (3R, 3G and 3B), responsive to the output signal of said photoelectric conversion means (1), for sequentially generating a plurality of color component signals corresponding to said plurality of monochromatic lights, and
wherein the input signal applied to each of said control signal generating means is either a corresponding one of said color component signals or a manually adjusted signal.

15. The solid-state image sensing apparatus according to claim 1 wherein said control means further comprises:
a plurality of control signal generating means (14R, 14G, 14B), each of which is operative in response to a corresponding input signal and is associated with a corresponding one of said plurality of monochromatic lights, for generating a plurality of control signals, and timing signal generating means responsive to said plurality of control signals for generating said first timing designated by each of said control signals.

16. The solid-state image sensing apparatus according to claim 15 wherein each of said control signal generating means (14R, 14G, 14B) comprises:

input signal comparison means (141, 142) for comparing the corresponding input signal against predefined high and low reference levels, and means (143, 144, 145), responsive to a first synchronization signal having a period corresponding to one field and to said input signal comparison means, for generating, in synchronism with said first synchronization signal, first or second direction signals as said control signal in the event said input signal is greater than said high reference level or is less than said low reference level, respectively.

17. The solid-state image sensing apparatus according to claim 16 wherein said timing signal generating means comprises:

first counting means (203), responsive to a second synchronizing signal having a period corresponding to each line in said field, for counting lines in each field and for providing a first counted value for each of said lines, a plurality of value producing means (21R, 21G, 21B), each of which is responsive to the first and second direction signals produced by a corresponding one of said control signal generating means, for providing a plurality of second values for identifying a particular line at which said effective photoelectric conversion period is to start within a corresponding predetermined field for each of said pluralities of monochromatic lights, a selector (22), operative in response to said first synchronizing signal, for sequentially selecting a successive one of said plurality of second values in synchronism therewith so as to provide a selected second value, and comparison means (204), operative in response to said first counted value and the selected second value, for providing a pulse as said first timing when the first counted value and the second value coincide.

18. The solid-state image sensing apparatus according to claim 17 wherein each of said value producing means comprises either a memory, responsive to said first and second direction signals, for producing said second value or second counting means for respectively incrementing and decrementing its contents in response to said first and second direction signals and for providing the contents as said second value.

19. The solid-state image sensing apparatus according to claim 17 wherein said color signal forming means comprises:

color component generating means (3R, 3G and 3B), responsive to the output signal of said photoelectric conversion means (1), for sequentially generating a plurality of color component signals corresponding to said plurality of monochromatic lights, and wherein the corresponding input signal applied to each of said control signal generating means is either a corresponding one of said color component signals or a manually adjusted signal.

20. In a solid-state image sensing apparatus having light emit means (8) for light emit means (8) for repeatedly emitting each one of first, second and third monochromatic lights in succession at predetermined periods to illuminate an object, each of said lights being emitted during a corresponding one of said pre-determined periods, and photoelectric conversion means (1) for converting light produced by said light emit means and reflected back from said object into a charge signal, a method for producing a substantially white balanced depiction of the object, comprising the steps of:

first transferring charge at a first timing and in a first direction within said photoelectric conversion means so as to expel residual charge existing therein and, in so doing, set the charge signal to an initial value and second transferring charge within said photoelectric conversion means, at a second timing and in a direction opposite to said first direction, that has accumulated between said first and second timings and in response to said reflected light, so as to read a value of said charge signal attributable to said accumulated charge occuring for one of said predetermined periods, said second timing occurring subsequent to said first timing, converting said charge signal into color signals, and setting said first and second timings for each individual one of said predetermined periods so as to control duration of an effective photoelectric conversion period occurring between said first and second timings for said each individual one period such that the duration of said photoelectric conversion period is individually set for each of said monochromatic lights so as to appropriately vary an amplitude of an output signal from said photoelectric conversion means for each of said monochromatic lights in order to substantially achieve a white balance in said color signals.

* * * * *